US011195250B2

(12) United States Patent
Pieters et al.

(10) Patent No.: US 11,195,250 B2
(45) Date of Patent: Dec. 7, 2021

(54) PREDICTION SYSTEM FOR TEXTURE STREAMING

(71) Applicant: GRAPHINE NV, Ghent (BE)

(72) Inventors: Bart Pieters, Ghent (BE); Charles-Frederik Hollemeersch, Drongen (BE); Aljosha Demeulemeester, Destelbergen (BE)

(73) Assignee: Graphine NV, Ghent (BE)

( * ) Notice: Subject to any disclaimer, the term of this patent is extended or adjusted under 35 U.S.C. 154(b) by 0 days.

(21) Appl. No.: 16/945,522

(22) Filed: Jul. 31, 2020

(65) Prior Publication Data

US 2020/0410633 A1    Dec. 31, 2020

Related U.S. Application Data

(63) Continuation of application No. 15/523,446, filed as application No. PCT/EP2015/075249 on Oct. 30, 2015, now Pat. No. 10,748,241.

(Continued)

(30) Foreign Application Priority Data

Dec. 8, 2014  (EP) .................................... 14196784

(51) Int. Cl.
*G06T 1/60*  (2006.01)
*G06T 15/04*  (2011.01)
(Continued)

(52) U.S. Cl.
CPC ................ *G06T 1/60* (2013.01); *G06T 15/04* (2013.01); *G06T 19/00* (2013.01);
(Continued)

(58) Field of Classification Search
CPC ........... G06T 1/60; G06T 19/00; G06T 15/04; G06T 2210/08; G06T 2210/36; H04L 65/80; H04L 65/4084; H04L 65/607
(Continued)

(56) References Cited

U.S. PATENT DOCUMENTS 6,057,847 A    5/2000  Jenkins
6,891,546 B1   5/2005  Park et al.
(Continued)

FOREIGN PATENT DOCUMENTS

EP    3016075 A1    5/2016
EP    3216011 A1    9/2017
(Continued)

OTHER PUBLICATIONS

"U.S. Appl. No. 15/523,446, Corrected Notice of Allowability dated Jul. 9, 2020", 6 pgs.
(Continued)

*Primary Examiner* — Jennifer Mehmood
*Assistant Examiner* — Kim Thanh T Tran
(74) *Attorney, Agent, or Firm* — Schwegman Lundberg & Woessner, P.A.

(57) ABSTRACT

The present invention relates to a prediction system for determining a set of subregions to be used for rendering a virtual world of a computer graphics application, said subregions belonging to streamable objects to be used for rendering said virtual world, said streamable objects each comprising a plurality of subregions. The prediction system comprises
a plurality of predictor units arranged for receiving from a computer graphics application information on the virtual world and each arranged for obtaining a predicted set of subregions for rendering a virtual world using streamable objects, each predicted set being obtained by applying a different prediction scheme, (Continued)

a streaming manager arranged for receiving the predicted sets of subregions, for deriving from the predicted sets a working set of subregions to be used for rendering and for outputting, based on the working set of subregions, steering instructions concerning the set of subregions to be actually used.

20 Claims, 7 Drawing Sheets

Related U.S. Application Data (60) Provisional application No. 62/074,127, filed on Nov. 3, 2014.

(51) Int. Cl.
*G06T 19/00* (2011.01)
*H04L 29/06* (2006.01)

(52) U.S. Cl.
CPC ........ *H04L 65/4084* (2013.01); *H04L 65/607* (2013.01); *H04L 65/80* (2013.01); *G06T 2210/08* (2013.01); *G06T 2210/36* (2013.01)

(58) Field of Classification Search
USPC .......................................................... 345/522
See application file for complete search history.

(56) References Cited

U.S. PATENT DOCUMENTS

| | | | |
|---|---|---|---|
| 10,748,241 B2 | 8/2020 | Pieters et al. | |
| 2002/0075311 A1 | 6/2002 | Orbanes | |
| 2002/0167523 A1 | 11/2002 | Taylor et al. | |
| 2004/0135784 A1 | 7/2004 | Cohen et al. | |
| 2006/0257099 A1 | 11/2006 | Potrebic et al. | |
| 2007/0064005 A1 | 3/2007 | Antoine | |
| 2008/0147971 A1 | 6/2008 | Hawkins et al. | |
| 2009/0284535 A1 | 11/2009 | Pelton et al. | |
| 2011/0222602 A1 | 9/2011 | Sung et al. | |
| 2011/0286678 A1 | 11/2011 | Shimizu et al. | |
| 2012/0106794 A1* | 5/2012 | Iwasaki | G06T 7/215 382/103 |
| 2013/0031335 A1 | 1/2013 | Santosuosso et al. | |
| 2013/0321402 A1 | 12/2013 | Moore et al. | |
| 2014/0373032 A1 | 12/2014 | Merry et al. | |
| 2015/0254870 A1* | 9/2015 | Knibbe | G01S 11/12 345/633 |
| 2017/0316543 A1 | 11/2017 | Pieters et al. | |

FOREIGN PATENT DOCUMENTS

| | | |
|---|---|---|
| EP | 3216011 B1 | 7/2020 |
| WO | WO-2016071223 A1 | 5/2016 |

OTHER PUBLICATIONS

"U.S. Appl. No. 15/523,446, Final Office Action dated Mar. 8, 2019", 26 pgs.
"U.S. Appl. No. 15/523,446, Non Final Office Action dated Aug. 9, 2018", 26 pgs.
"U.S. Appl. No. 15/523,446, Non Final Office Action dated Nov. 12, 2019", 25 pgs.
"U.S. Appl. No. 15/523,446, Notice of Allowance dated Apr. 10, 2020", 9 pgs.
"U.S. Appl. No. 15/523,446, Preliminary Amendment filed May 1, 2017", 9 pgs.
"U.S. Appl. No. 15/523,446, Response filed Nov. 8, 2018 to Non Final Office Action dated Aug. 9, 2018", 18 pgs.
"U.S. Appl. No. 15/523,446, Response filed Jul. 5, 2019 to Final Office Action dated Mar. 8, 2019", 12 pgs.
"European Application Serial No. 14196784.4, Extended European Search Report dated Sep. 25, 2015", 7 pgs.
"International Application Serial No. PCT/EP2015/075249, International Preliminary Report on Patentability dated May 18, 2017", 9 pgs.
"International Application Serial No. PCT/EP2015/075249, International Search Report dated Mar. 10, 2016", 4 pgs.
"International Application Serial No. PCT/EP2015/075249, Written Opinion dated Mar. 10, 2016", 7 pgs.
Daniel, Cornel, "Texture Virtualization far Terrain Rendering", Internet Citation., [Online] Retrieved from the internet: <http:lldrivenbynostalgia.comlfilesiTexture%20Virtualization% 20for%20Terrain%20Rendering.pdf>, (Apr. 2012), 1-10.
Igehy, H, et al., "Prefetching in a texture cache architecture", Proceedings of the 1998 Eurographics/SIGGRAPH Workshop on Graphics Hardware. Lisbon, (Aug. 31- Sep. 1. 1998), 133-142.

* cited by examiner

Original Image          Mip-mapped and Tiled Textures

PREDICTION SYSTEM FOR TEXTURE STREAMING

This application is a continuation of and claims the benefit of priority under 35 U.S.C. § 120 to U.S. patent application Ser. No. 15/523,446, filed on May 1, 2017, which is a U.S. National Stage Filing under 35 U.S.C. 371 from International Application No. PCT/EP2015/075249, filed on Oct. 30, 2015, and published as WO 2016/071223 A1 on May 12, 2016, which claims the benefit of priority to European Application No. 14196784.4, filed on Dec. 8, 2014, and to U.S. Provisional Patent Application No. 62/074,127, filed on Nov. 3, 2014, each of which is incorporated by reference herein in its entirety.

FIELD OF THE INVENTION

The present invention is generally related to the field of computer graphics applications and in particular to applications wherein a multitude of objects are streamed for rendering a virtual world.

BACKGROUND OF THE INVENTION

To achieve visually compelling results, computer graphics applications may render many virtual objects to the screen, with each virtual object preferably having a high level of detail. The application may typically hold multiple representations of those virtual objects in memory, for example, the geometry of an object or a texture mapped on the geometry, each with a set of different levels-of-detail (LODs), such that the application can select the LOD representation which results in the best visual quality. For example, a tree at a great virtual distance does not have to be rendered with high fidelity, so the texture for that tree may have a low resolution. The virtual world the application renders may contain many more virtual objects and representations each with different LODs than can fit into the application's memory.

A streaming engine is an engine that loads representations with different LOD of the virtual objects in a small but fast cache memory from a large but slow storage. This is done once the virtual object is needed for processing or rendering. These representations are called streamable objects, for example, a texture or a geometry model. To allow for more fine-grained streaming, the streamable objects with their LODs are split into subregions, called tiles, which the streaming engine streams. For example, textures are split into small, rectangular regions of pixels.

Streaming tiles from storage into memory may require a considerable amount of time. If the tile is streamed from a spinning disk to memory, the disk heads need to align, data needs to be read, tiles need to be decompressed and copied to GPU texture memory. During this time the user may be faced with a reduced quality of experience as the tile is not available for rendering. For example, the scene may be rendered partially with no textures until the texture becomes available. The scene may be rendered with a tile with lower quality. However, once the requested tile with higher quality becomes available, the user may be presented with a virtual object of which the rendering fidelity suddenly changes. In other words, the user may see additional detail 'popping in the screen' once the tile is loaded.

Clearly, it is preferable to have the tiles required to render a scene available into cache memory and, preferably, to have them ready in the cache memory before or at the moment the application uses them for the first time. If the scene can be rendered solely with tiles present in the cache, there will be no sudden popping of additional detail in the rendered results and the user can always enjoy the highest quality of experience.

By predicting the working set of a virtual scene, i.e., the set of tiles to be used to render the scene, the cache can be optimized and the application does not have to wait until the tile is available for rendering. The delay between a tile request and the moment a tile becomes available for the application, can be hidden and the user may never experience the aforementioned popping of detail.

Precisely predicting the working set allows for better use of bandwidth and computational power as streaming of unused tiles is avoided, but it comes at the cost of increased computational complexity. However, most often, highly complex predictors do not have to be run for every render of a virtual scene and low-complexity predictors may return inaccurate results.

To solve these problems, there is a need for improved tile prediction that also allows for better scaling of the computational load of the predictions on the computer system.

The paper '*Texture Virtualization for Terrain Rendering*' (D. Cornell, April 2012, pp. 1-10) relates to virtual texturing and presents an overview of virtual texturing technology and virtual texturing pipelines. It discusses how a scene can be rendered to a need buffer which stores information on texture tiles in order to determine the visible texture regions that need to be loaded in a streaming cache. The paper discusses various different stand-alone techniques which can be used by a predictor to determine these visible texture regions. The paper implies using a single predictor for determining said visible texture regions, running in a static configuration for each frame. Hence, only stand-alone specialized techniques are presented. These stand-alone techniques are not shown to have any adaptive properties concerning their activation or deactivation, frequency of execution, computational complexity or combination with other techniques.

The bachelor thesis '*Virtual Texturing*' (A. Neu, April 2010) presents an overview of virtual texturing technology and virtual texturing pipelines. As in the paper of Cornell, the thesis discusses how the scene can be rendered to a need buffer which stores information on texture tiles in order to determine the visible texture regions that need to be loaded in a streaming cache. Various different stand-alone techniques are discussed which can be used by a predictor to determine the visible texture regions. Also here the use of a single predictor for determining the visible texture regions running in a static configuration for each frame, is implied.

In US2008/147971 a predictive model is used to populate a cache in a videogame system. The predictive model takes as an input a sequence of file sections that have been requested for the associated videogame thus far. The predictive model then returns the names or indicators of one or more file sections that will likely be requested in the future along with a probability that those file sections will be requested. This can be used to reduce the load times during the execution of the video game.

SUMMARY OF THE INVENTION

It is an object of embodiments of the present invention to provide for a solution that contributes in optimizing the streaming of objects to be used for rendering a virtual world of a computer graphics application.

The above objective is accomplished by the solution according to the present invention.

In a first aspect the invention relates to a prediction system for determining a set of subregions to be used for rendering a virtual world of a computer graphics application, said subregions belonging to streamable objects to be used for rendering said virtual world, said streamable objects each comprising a plurality of subregions. The prediction system comprises a plurality of predictor units arranged for receiving from a computer graphics application information on the virtual world and each arranged for obtaining a predicted set of subregions for rendering a virtual world using streamable objects, each predicted set of subregions being obtained by applying a different prediction scheme, a streaming manager arranged for receiving the predicted sets of subregions, for deriving from the predicted sets a working set of subregions to be used for rendering and for outputting, based on the working set of subregions, steering instructions concerning the set of subregions to be actually used.

The proposed solution indeed allows for optimized streaming when rendering a virtual world of a computer graphics application. The streamable objects to be used for rendering are divided into a plurality of subregions, usually referred to as tiles in the art. By performing two or more predictions of the set of subregions to be used for rendering, the set of subregions to be used for rendering can be determined more precisely, as well as the set of subregions that are used for rendering the future virtual scene of a virtual world. Multiple predictors allow for more precise steering of a fine-grained streaming system for loading subregions to memory and allow for loading them in time such that the application has the subregions available upon first use, so improving the visual quality of the rendered scene. Multiple predictors also allow for better scaling of the computational load of the prediction system on the computer system. The output of the multiple predictors is combined and a working set proposal is derived. This working set proposal is used to steer the streaming engine to manage the subregions actually to be used and streamed.

In a preferred embodiment at least one streamable object is represented by subregions corresponding to a plurality of different level-of-detail versions of the at least one streamable object. Having several versions corresponding to different resolutions allows selecting at any time the version that yields the best render result in the given circumstances and allows for faster fine-grained streaming of subregions of streamable objects.

In one embodiment the streaming manager is arranged to exploit information on the accuracy of the plurality of predictions to optimize the steering instructions. This information can be taken into account when deciding on the set of subregions that will actually be used for rendering.

In another preferred embodiment the prediction system comprises a predictor controller arranged to select and control a subset of the plurality of predictor units and/or a timing scheme or a rate at which each predictor unit of said plurality works. The predictor controller can control the prediction system, e.g. to trigger a predictor to run. A system with a predictor controller is clearly equivalent to a system without such a controller, but where instead the prediction system itself holds the controlling logic.

In one embodiment the subset and/or the timing scheme or the rate at which each predictor unit works, is determinable at run time. In another embodiment the subset and/or the timing scheme or the rate at which each predictor unit works, is determinable in accordance with available system resources and/or based on the computational complexity of the predictor units and/or based on the accuracy of results of the predicted sets of subregions and/or the delay at which the predicted sets become available. The proposed system indeed allows for multiple predictors to be active at any given time in the application's runtime, where the proposed system chooses which subset of predictors is active at a given time, and at which rate these predictors work. In such a way, prediction can not only allow for more precise steering of the streaming system, but also continuously and dynamically adapt the prediction scheme to the application's requests, to the computer resources, to the complexity of the running schemes and to the accuracy of the predictor's output, throughout the application's runtime.

In a preferred embodiment the streamable object is a texture to be mapped to an object used for rendering a scene of the virtual world. The subregions, usually called tiles, are parts of the texture image.

In another embodiment streamable object is a geometry model used to render a scene of the virtual world.

In one embodiment one or more of the predicted sets of subregions are obtained at an own rate, i.e. the rate at which the predictor unit yielding that predicted set works. For example, predictions that require less computation can be performed more often than predictions with a high computational load.

In another embodiment one of the predicted sets is obtained by determining which streamable objects or which subregions are within a given virtual distance in a virtual scene.

In one embodiment at least one of said prediction schemes comprises rendering a scene from a virtual camera position and identifying a unique subregion identifier.

Advantageously, at least one of the prediction schemes is arranged for performing a prediction whereby a virtual camera position in the virtual world is exploited different from a main virtual camera position for rendering the application. This allows anticipating the tile visibility, as a future position of a virtual camera can be exploited.

Advantageously, at least one of the prediction schemes is arranged for performing a prediction whereby the virtual world is rendered with no occluding objects or wherein occluding objects are rendered with a level of transparency.

In another embodiment the streaming manager is arranged for determining the set of subregions to be actually used by assigning a weight to the various subregions of the predicted sets. The weight may for example take into account the number of occurrences of a subregion in the plurality of predicted sets. This allows for prioritizing streaming of subregions.

In a preferred embodiment the streaming manager is arranged for selecting memory slots to be reused and for forwarding an indication of the selected memory slots in said steering instructions.

In one embodiment the streaming manager is arranged for outputting steering instructions by refining the output of one or more predictors using the output of at least one other predictor.

In a preferred embodiment the application is a video game software application.

In another aspect the invention relates to a method for determining a set of subregions to be used for rendering a virtual world of a computer graphics application, said subregions belonging to streamable objects to be used when rendering that virtual world, said streamable objects each comprising a plurality of subregions. The method comprises receiving from a computer graphics application information on a virtual world, obtaining a plurality of predicted sets of subregions for rendering a virtual world using streamable objects, each predicted set of subregions being obtained by applying a different prediction scheme, deriving from the predicted sets of subregions a working set of subregions to be used for rendering, outputting, based on the working set of subregions, steering instructions concerning the set of subregions to be used.

In another aspect the invention relates to a program, executable on a programmable device containing instructions, which when executed, perform the method as described above.

In yet another aspect the invention relates to a video game console comprising a prediction system as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes a prediction system for optimizing a streaming system, wherein a plurality of subregions of streamable objects is streamed to a memory of a computer graphics application to be used for rendering a virtual world. The proposed prediction system receives information on the virtual world from the computer graphics application and predicts by means of a set of predictors, each applying a different prediction scheme, a plurality of predicted set of subregions used for rendering said virtual world using said streamable objects. A working set of subregions is derived from the resulting predictions and a streaming manager component outputs steering instructions for the streaming engine concerning the set of subregions to be actually used to render the application.

In the most preferred embodiments a solution is proposed for optimizing a streaming system which streams a plurality of subregions, possibly with different levels-of-detail (LODs), to a memory in a rendering application. The subregions, which can be streamed independently, are referred to as tiles. The presented approach steers the streaming of a streaming engine to the streaming cache by performing tile predictions which indicate which tiles are needed by the application for computational operations such as rendering the current or future virtual scene. The required set of tiles is called the working set. The system preferably runs multiple predictors. The predictions can each be obtained with their own method/algorithm for predicting the current or future tile working set, their own accuracy of the results and their own computational complexity. The predictions may be performed at different frequency intervals in order to repeatedly and accurately predict the tile working set.

Figure 1:
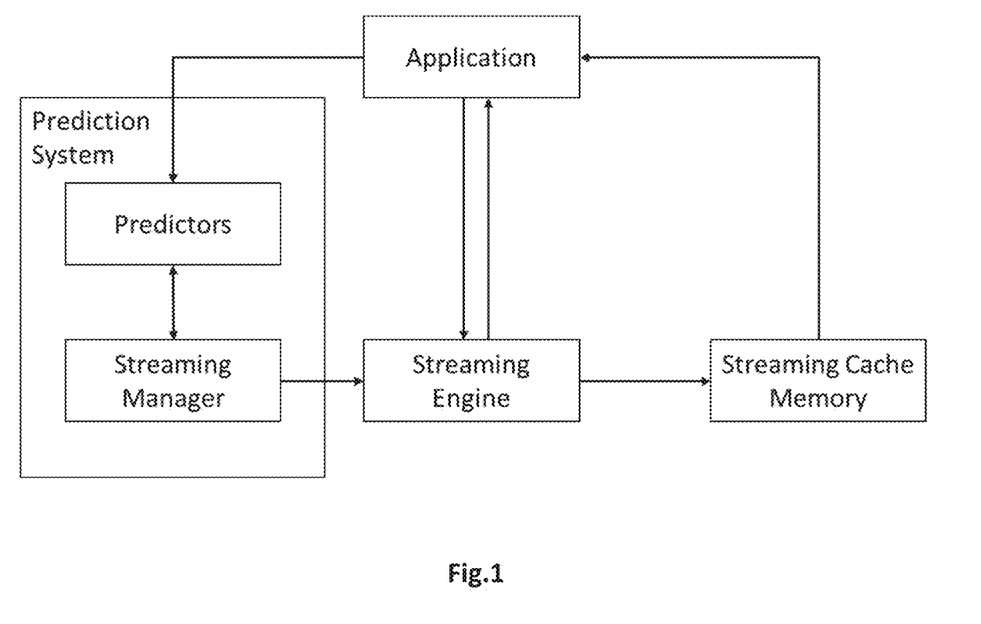
FIG. 1 illustrates an embodiment of a data caching system according to the invention.

FIG. 1 is a high-level block diagram of an embodiment of a prediction system according to the present invention. The proposed system comprises prediction means for performing two or more predictions and a streaming manager and is connected to a computer graphics application, a streaming engine and a cache memory. The prediction system may be part of a gaming system, personal computer, workstation, server system, part of a hardware architecture or of a software architecture. The application may be a rendering application rendering a 2D or 3D virtual world, or any other application requiring streamable objects processing capabilities. Streaming cache memory includes processor readable memory to store streamable objects used by the application to render. It may reside in system memory, e.g., system RAM, or in GPU accessible memory, on a discrete GPU with dedicated memory or in shared system memory accessible by the GPU. The streaming engine loads, in response to requests it receives from the application and the streaming manager, subregions of streamable objects, possibly with different levels of detail. It may be a dedicated component in hardware or a software module. The prediction system may be built in hardware (e.g., in a GPU), but it can also be implemented as a module running in software on the system processor(s). A mixture of both options is possible as well.

The application may be a video game software application, a general rendering application rendering a virtual scene. It may be a virtual reality application. It may render or process a single virtual scene or multiple virtual scenes at once, for example, for 3D stereoscopic vision. The computing device whereon the application is run, may be a video game console. Alternatively the application may be running on or the computing device may be included in e.g. a cell phone, mobile device, embedded system, media console, laptop computer, desktop computer, server and/or data centre. The application may render and/or display a virtual scene, or it may render a virtual scene and use the rendering step output to carry out other calculations. The application may render a two-dimensional or a three-dimensional scene. The application may visualize a rendered scene directly to a screen, it may send the results in the form of a video bit stream or it may process the rendered scene to perform other calculations. The application may be a rendering application designed to present and render the virtual world, the application may be designed to edit or author a virtual world, or both present and edit the virtual world. For example, the application may be an editor application for the virtual world of a video game capable of rendering the virtual world in an editor mode for editing the virtual world, and render the virtual world in an end-user mode that renders the game as it would run, once its production is finalised and it is shipped to a gamer on, for example, a DVD-ROM. In this scenario, the invention can be used to predict the tile working set and embed tile working set descriptors in the game content for the streaming engine to use once the game runs on the end user's device.

The application renders the scene using streamable objects (SOs) from the memory. A SO can be a texture which the application can map to geometry. A SO can also be geometry data, e.g., a mesh model built up with polygons or points the application uses to render the scene. A SO can also be more generalized data, such as animation key frames. Multiple level of detail (LOD) versions of a same SO may be present. Each LOD version of the SO describes the same render object, but with a different quality (or possibly a different amount of data to represent the SO). A plurality of LODs may be resident in memory to render the scene using the LOD version of the SO the application has selected (e.g., the LOD which yields the best sampling result). For example, a low-accuracy model of a mountain containing few geometrical data (low number of polygons for example) may be used when rendering a mountain from a high virtual distance in the virtual world, while a highly accurate model (containing many polygons) may be used when rendering the mountain from close up. LODs may be streamed by the streaming engine. LODs may be generated by the application and derived from available LODs of a SO. In case a SO is composed of geometry data, different LODs form different representations of the geometry model, each with a different quality, for example, by means of more or less polygons to describe the geometric model. In case a SO is a texture, LODs may include multiple representations of an image, each with more or less pixels to describe the image. In case a SO is composed of model animation key frames, LODs may include multiple representations of the animation, each with more or less key frames describing the transitions of the models in the animation. A LOD may also represent multiple representations of a SO each with a different level of quantization. For example, in case a SO is a texture, texture images may be stored with a smaller colour pallete.

Figure 2:
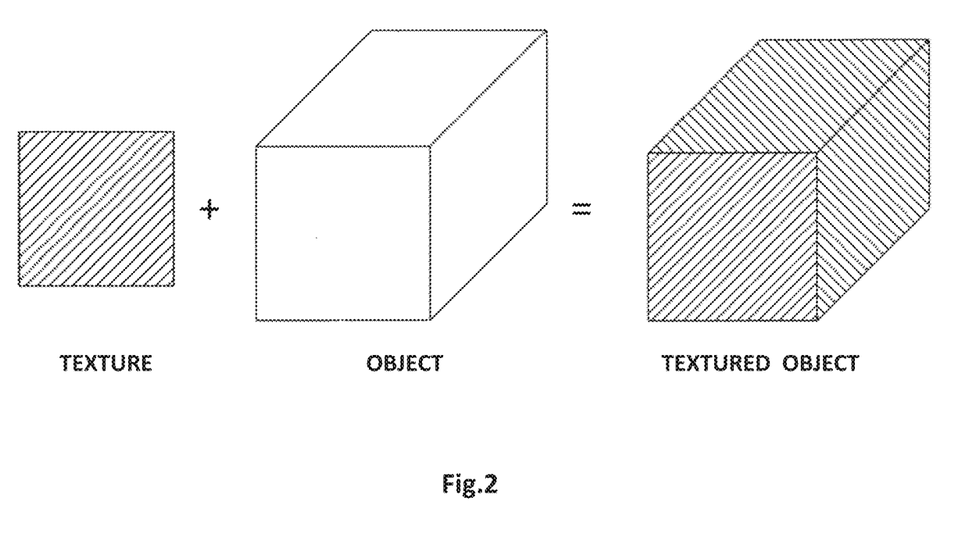
FIG. 2 illustrates texture mapping.

A brief overview is now presented of texture mapping, such as can be performed in conjunction with embodiments of the invention. In FIG. 2 a texture sample is applied to an object to result in a textured object. The texture sample is generally a graphics file that represents a texture one wishes to have mapped to the object. The object as shown in FIG. 2 is a three-dimensional object. However, the object can also be a two-dimensional object, for example. By using a predetermined manner known in the prior art, the sample is applied to the object to result in the textured object. The textured object has the same shape as the object, but has on at least its visible surfaces the texture pattern. Sometimes a set of coordinates is set for each vertex of the shape, generally referred to as UV coordinates. These coordinates determine which region of the texture is mapped to the surface of the object. The coordinates typically have values between zero and one. For example, the front face of the cube in the figure has four vertices, with UV coordinates [0,0], [0,1], [1,0] and [1,1], designating that the entire texture is mapped to the surface. For example, coordinates [0,0], [0,0.5], [0.5,0] and [0.5,0.5] designate that the first quarter of the texture is mapped to the surface. Applying the texture to the object to result in the textured object is referred to generally as texture mapping.

For example, a SO may be a texture. A texture can hold any type of two or three-dimensional data, including but not limited to colour data, surface normal vectors and specular reflection data. The texture data may comprise of multi-resolution texture pyramids, MW (multum-in-parvo) levels. At the lowest-level (level 0) of a pyramid is the full resolution image. At the next higher level (level 1) of a pyramid is the image at a lower resolution (for instance, 2×2 pixels or texels in the lowest level are averaged to form a single texel in the next highest level). At the next higher level is the image at an even lower resolution. Moving towards the top of the pyramid, the image resolution becomes progressively lower. Much less data is needed to represent the lowest resolution image than the highest resolution image. Each MIP level represents a different level of detail.

A SO is split into a plurality of subregions, called tiles. Each subregion describes a part of the entire SO. These subregions may be geometric subregions of a SO, for example, 3D spatial regions of a geometry model or 2D spatial regions of a 2D texture. They may be general subchunks of memory of the memory buffer the SO describes. If the SO holds multiple LODs, each LOD can be split into subregions (tiles). A tile with a certain LOD may be represented by one or more tiles on a different LOD. Subregions may comprise of an entire MIP level. In other words, a tile then corresponds to a single level of the LOD pyramid. Note that tiles do not need to have a uniform size or subregion layout. The use of tiles allows for a more fine-grained streaming granularity. Many different ways to divide the SO into subregions are available in the art. Tiles may hold compressed or uncompressed texture data. The data may be compressed using a variable-length compression format, such as ZIP or with a vector quantization method, such as DXT1 or ASTC. Other compression schemes are possible as the skilled person will readily appreciate. The data may also be uncompressed. The data of a tile may rely on the data of other tiles to represent a (part of a) SO. For example, a tile on level 3 may hold data that is used to refine the data of a tile on level 4.

Figure 3:
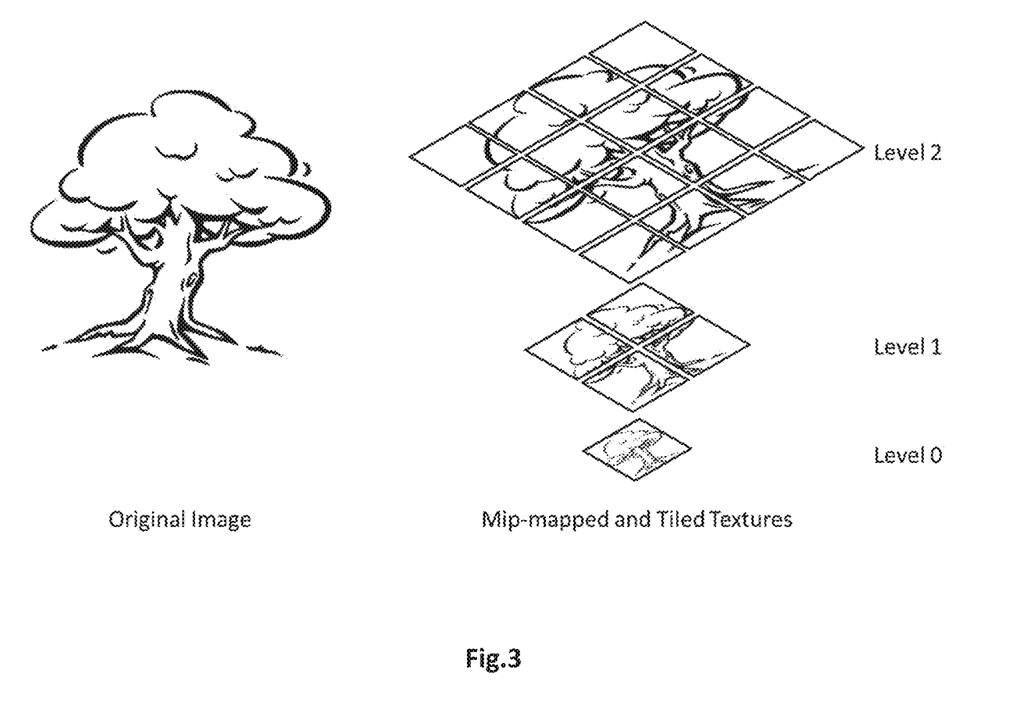
FIG. 3 illustrates a 2D texture with multiple MW levels.

When an SO is a texture, the texture is broken up into tiles, i.e. in subregions of the texture image. If the texture contains multiple MIP levels, each MIP level can be broken into tiles. FIG. 3 illustrates this for a two-dimensional texture. A tile on a certain MIP level may be represented by multiple tiles on another MIP level. For example, in FIG. 3 the tile on the highest level, i.e. the lowest-resolution level, is represented by four tiles on the next MW, which has a higher-resolution (lower level). Subregions may consist of an entire MIP level. In other words, a tile corresponds to a single level of the pyramid. It is not needed that tiles all have the same size. Tiles may be 2D rectangular regions or 3D cubic regions. Two tiles may hold data from two different MIP levels, in other words, they contain data with a different level-of-detail (LOD). Each MIP level, from the highest-detailed texture (i.e., the lowest level on the pyramid) to the lowest-resolution texture (i.e., the highest level) of the texture may be split into tiles. Tiles may comprise compressed or uncompressed texture data. The data may be compressed using a variable-length compression format, such as JPEG or JPEG XR, or with a vector quantization scheme, such as DXT1 or ASTC. Other compression techniques are possible. The data of a tile may rely on the data of other tiles to represent a (part of a) SO. For example, a texture tile on level 3 may hold data to refine the data of a tile on level 4, for example, by holding only high frequency image data that is added to the lower-resolution image data of the tile on level 4.

For example, a texture of 1,024 by 1,024 pixels may hold 2D colour information. It has 11 MIP levels, i.e., the 1,024×1,024 image, level 0, a 512×512 level, i.e. level 1, a 256×256, this is level 2, 128×128, level 3, 64×64, level 4, 32×32, level 5, 16×16, level 6, 8×8, level 7, 4×4, level 8, 2×2, level 9 and a 1×1 level, which is level 10. This texture can be split into 2D tiles with size 128 by 128 pixels. Level 0, the highest detailed level, holds 8×8, thus 64, tiles. Level 1 holds 16 tiles, level 2 holds four tiles and level 3 one tile. Optionally all levels can be omitted that are smaller than the tile size. In this example, all levels higher than 3 are omitted. One can also opt to put levels smaller than the tile size in tiles. In this example, this means level 4 with its image of 64 by 64 pixels would be put into a 128 by 128 tile, just as level 5 up to 10.

Figure 4:
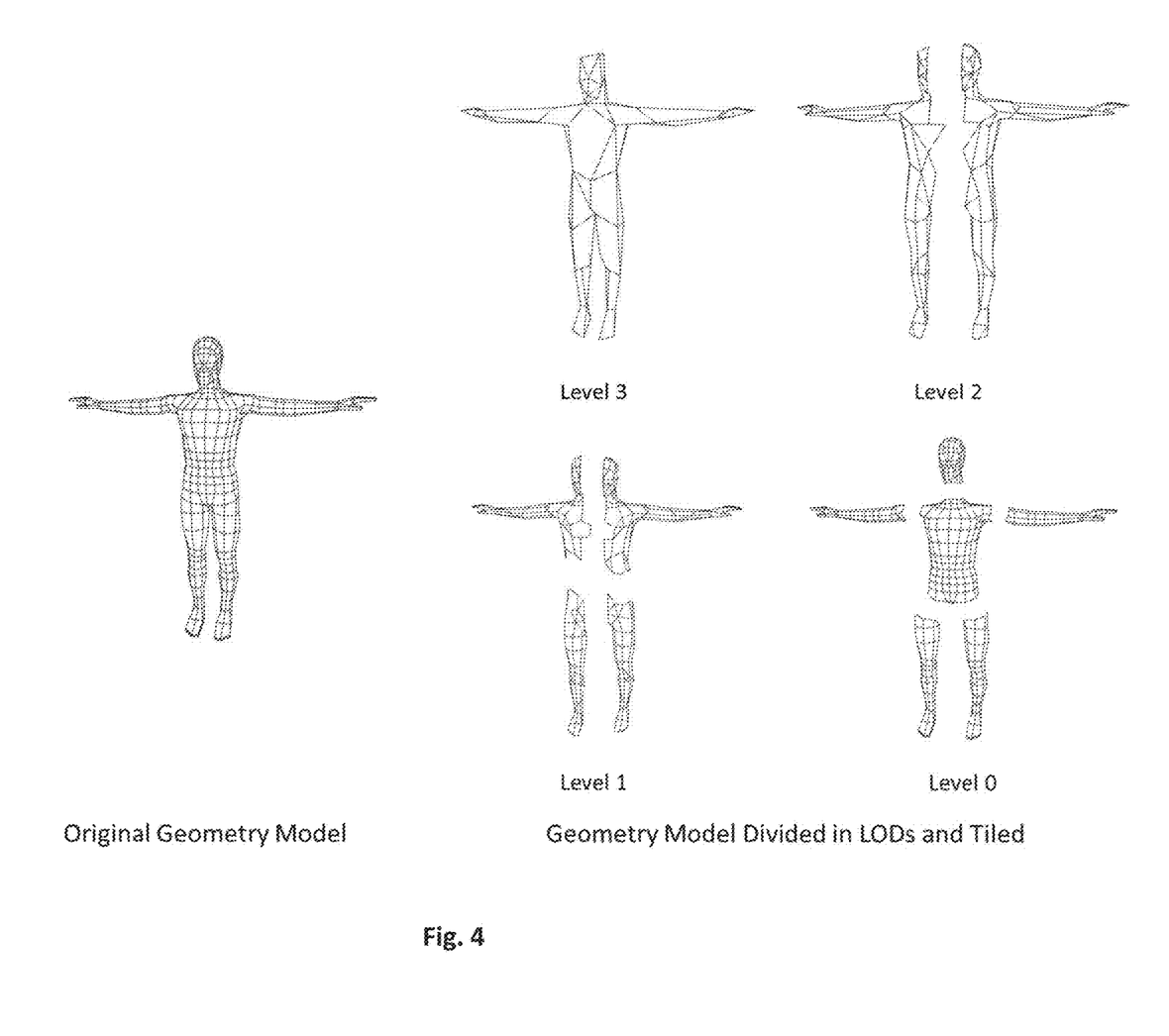
FIG. 4 illustrates a geometry model with multiple LOD levels, each broken into tiles.

When an SO is a geometry model, the model is broken up into tiles, i.e. in subregions of the model. If the model contains multiple LOD levels, each level is broken into tiles. FIG. 4 illustrates this for a three-dimensional model mesh built from vertices and triangles. A tile on a certain LOD level may be represented by multiple tiles on another LOD level. For example, in FIG. 4 the tile on the highest level, i.e. the lowest-resolution level, is represented by two tiles on the next LOD, a higher-resolution, lower level. Subregions may consist of an entire LOD level. Tiles may hold 2D rectangular regions or 3D cubic regions. Two tiles may hold data from two different LOD levels. Each LOD level, from the highest detailed model (i.e., the lowest level of the pyramid) to the lowest-resolution model (i.e., the highest level) may be split into tiles. Tiles may hold compressed or uncompressed data. The compressed data may be compressed using a compression format such as ZIP. Other compression techniques are possible.

For example, a geometry model as depicted in FIG. 4 may have four LODs, level 0, level 1, level 2 and level 3. Each LOD represents the same model of a person, but with a different quality. Each LOD is subdivided in subregions, tiles, each holding a number of the vertices that describe the model. For example, level 2 is split into two tiles each holding a half of the model. Level 1 is split into four tiles, each holding a quarter of the model. Level 0 is split into six tiles, each holding one sixth of the vertices of the model.

The streaming engine loads SO tiles into its cache memory in response to requests it receives. Streaming of SOs allows the use of many virtual objects with accompanying SOs, for example, many virtual trees in a virtual world, with each their unique textures. There can be many more virtual objects than what would fit into system or GPU memory. These SO tiles are loaded in a fast streaming cache memory that the application accesses. The streaming engine may load the SO tiles from a slower storage medium, such as a hard disk. The storage system is typically larger than the cache memory, hence the streaming cache performing a caching function between larger but slower memory and the application. The requests the streaming engine receives originate from the application or from other operators, for example, a person who has set a list of tiles to be loaded when editing the virtual world. Such operators may fulfil the task of helping the streaming system streaming in the right tiles at the right moment.

Streaming many virtual objects allows for better management of bandwidth and computational power. The SOs of these virtual objects are streamed on a by-need basis. Streaming an unneeded SO wastes computer resources, as a SO takes up valuable memory and processing the SO to get it from storage to memory consumes processing cycles. Going further and streaming SOs on a tile basis allows streaming on a by-need basis with much finer granularity and thus better use of bandwidth and computational power. Streaming SO tiles of a virtual object may involve amongst other things reading the SO from a storage device or network and decompressing the read bit stream to a format comprehensible for the rendering system. The streaming engine differentiates between LODs of different SOs. Multiple LODs of a SO may be requested and streamed to memory and the set of LODs of a SO loaded in memory may continuously change.

For example, suppose a SO is a geometry model of a virtual mountain. If the application renders a view on the virtual world of someone standing on a mountain, a SO containing the mountain's 3D model mesh for a low-level, highly detailed version will be requested by the application from the streaming engine. In case that same application renders a view of the virtual world at a great distance of said mountain, a SO containing a 3D model mesh for a high level, a low-detailed version of the mountain, will be requested by the application from the streaming engine. In case of multiple mountains, the same SO may be requested and reside in memory with different LOD.

To allow for more fine-grained streaming, SO tiles are streamed by the streaming engine. The application requests tiles instead of entire SOs. Streaming of SO tiles allows the use of virtual objects with accompanying SOs, SOs that are much larger than what would fit into e.g. a system or GPU memory. It allows for better management of bandwidth and computational power. The tiles of the SOs may be streamed on a by-need basis. Streaming a tile while it is not needed, is a waste of computer resources as a tile takes up valuable memory and processing the SO consumes processing cycles. The streaming engine differentiates between tiles with a different LOD. Multiple tiles with different LODs may be requested and streamed to memory and the set of LODs in memory of a tile may continuously change.

As another example, suppose a SO is a texture of a 3D model of a virtual mountain. If the application renders a view on the virtual world of someone standing on a mountain, tiles holding low-level LOD data, i.e., highly detailed texture data for the mountain mesh will be requested by the application to the streaming engine. Only tiles which hold texture data of the front of the mountain may be requested. In case the same application renders a view of the virtual world at a large distance of said mountain, tiles containing high-level LOD texture data, i.e., low detailed texture data, for the mountain model mesh may be requested by the application to the streaming engine. The tiles holding texture data for the back of the mountain not visible to the virtual camera, may not be streamed. In case of multiple mountains, the same tiles may be requested and reside in memory with different LODs.

The streaming engine may receive its requests directly from an application or from a rendering sub system or a different operator (e.g. a prediction system or another application). The requests may hold tile identification information, possibly including LOD in case tiling is combined with LOD. For example, the streaming engine may receive requests for tiles for a texture SO based on a two-dimensional index and a LOD index. In another example, texture tiles are requested by using a one dimensional index and a LOD index.

A brief overview of a texture streaming system, such as can be used in conjunction with embodiments of the invention, is now presented. The streaming system, as shown in FIG. 1, stands between the application and the streaming cache. It receives requests for a tile from the application or another operator. It has knowledge of which tiles are present in the cache memory and their position in memory. If a tile is requested, the streaming system checks if the tile is present in cache memory. If it is present, i.e., a cache hit, the streaming system immediately returns the information to the application so the application can read the tile data from the streaming cache memory. The streaming system may return the address of the tile in memory and the tile LOD level. It may return the tile itself with its data. If the requested tile is not present in the cache memory, i.e., a cache miss, the streaming system streams the tile into the cache memory. Before streaming for the requested tile is finished, it may return the tile cache information for a LOD that does reside in cache memory. The tile with the closest LOD can be returned. A 'tile-not-found' response may be given. The set of all tiles requested through the streaming engine for rendering a scene is called the working set. Below a brief overview is given of the reasons for having a streaming cache and a prediction system. Those skilled in the art will appreciate that many streaming and tile-based streaming systems are described in the art and that this invention is not limited to those described in this text.

Streaming tiles from storage into memory can require a considerable amount of time. If the tile is streamed from a spinning disk to memory, the disk heads need to align, data needs to be read, tiles need to be decompressed and copied to GPU texture memory. During this time the user may be faced with a reduced quality of experience. The scene may be rendered partially with no textures until the texture comes available, or it may just stop rendering until the texture comes available.

One way to improve the user experience if a tile is not present in the cache, is to render the scene with a tile with a lower LOD. However, the user can be presented with detail that pops in the screen, i.e., the user is confronted with a virtual object of which the rendering fidelity suddenly changes as cache misses become cache hits once the streaming engine has streamed the tiles to the cache memory. This might present itself as a very noticeable event in the rendering of the scene.

Clearly, it is preferable to have the tiles required to render a scene available in cache memory and, preferably, to have them ready in the cache memory before or at the moment the application uses them for the first time. If the scene can be rendered solely with cache hits, there will be no sudden popping of additional detail in the rendered results and the user can always experience the highest quality. By predicting the working set of a virtual scene, i.e., the set of tiles to be used to render the scene, and/or by predicting the working set of future scenes, the cache can be loaded by the streaming system in such a way that cache misses are minimized. Hence, the application does not have to wait until the tile is available for rendering, or does not have to resort to rendering SOs with tiles of different LOD. The delay between a tile request and the moment a tile is available for the application can effectively be hidden.

Furthermore, prediction allows better management of the streaming cache memory. When all cache slots, being a block of memory reserved for a tile in the cache memory, are taken, certain cache slots are selected to be reused, recycled and are flagged as available for the streaming engine to load new tiles in. By predicting the tile working set, tiles not belonging to the working set can be identified, i.e., tiles that are not necessary to render the scene. The cache slots for these tiles can be offered to the streaming engine to be recycled, without any influence on the rendering results.

A working set predictor, also named predictor, determines a prediction of a working set of a scene. It predicts which tiles will be required for rendering or processing a virtual scene. Hence, it predicts the content or future content of the cache. By predicting the cache, the streaming engine can be steered to fill the streaming cache in advance and the tiles may be available in the cache the first time they are used.

There are many ways to determine a scene working set. Each method has its own accuracy, typically coupled to computational complexity. More complex algorithms most often need more computations. In other cases, algorithms have an increased delay, i.e., the time between the start of the calculations and the moment the calculation results are available is significant. For example, running computations on a discrete graphics card can cause a greater delay between calculation initiation and result delivery than performing the same on a CPU.

For a rendering application it is not always feasible to run highly complex prediction algorithms continuously. Low complexity algorithms may define the scene working set with sufficient accuracy for certain scenes or at certain times. Contrary to high-complex algorithms, these low-complex algorithms can run continuously. By, for example, combining the output of low-complex continuously-running prediction algorithms with that of higher-complexity, intermittently-running prediction algorithms, visual fidelity may be increased enough to stop tiles with additional detail popping in with the user noticing it. Running preferably multiple predictors each with their own method/algorithm and their own accuracy of the results and their own computational complexity, each performed at different frequency intervals is the core of this invention. Next, said predictors are discussed.

A predictor may run on the CPU and output its results to the system memory. A predictor may run on the GPU and output its results to GPU memory or system memory. The following paragraphs list examples of predictors.

A SO may be a texture and a predictor may render a scene from the virtual camera position of the application on the GPU using a pixel shader which outputs on a per-pixel basis the texture tile used, including its LOD level (in case of a texture, its MW level). The rendered output is then copied from the GPU memory to the system memory where the predictor loops over all rendered pixels and identifies the unique tile identifiers (including their LOD levels) present in the screen. The cache predictor presents this unique list of tiles as its output. Such a predictor can be best described as having a very high accuracy and a high computational complexity, but because rendering asynchronously on the GPU introduces a delay typically in the order of milliseconds, such a predictor also introduces a high delay between the time of initiation of the algorithm and the time of results.

The predictor as described above may render the scene from a virtual camera position other than that of the main rendering view of the application. For example, the camera may be positioned at a point and a direction in the virtual world corresponding to a future or past position and direction of the virtual camera. A future camera position, for example, allows the system to predict the working set for a future frame. The effect is that the cache system can anticipate tile visibility.

The predictor as previously described may render the scene by rendering the virtual objects in the scene as disclosed before, but may omit a virtual object responsible for occluding the virtual camera from this rendering process. It may do this by deciding not to render the entire virtual object or parts thereof or by rendering the virtual object using a certain level of transparency resulting in occluded virtual objects becoming visible for the predictor and, hence, its results.

A SO may be a geometry model in the virtual scene and a predictor may trace rays from the current or future virtual camera position and intersect them with placeholder geometry models in the virtual world for the actual high-detailed models, running on the CPU. When a ray intersects with these placeholder geometric figures, the SO represented by the placeholder is identified and the distance between the intersection point and the camera is used to calculate the LOD level. The process is repeated for a number of rays originating from the virtual camera. The list of unique SOs with all their tiles is presented as the result of the predictor. Such a predictor is best described as having a medium accuracy, as it does not differentiate between tiles within the same LOD for a SO. It also has a low delay as all calculations are performed on the CPU synchronously and results are available almost immediately. The computational complexity depends on the number of rays being traced each time the predictor runs.

A SO may be a texture and a predictor may request all tile references used throughout the entire virtual world from the application, a subset of the virtual world or the loaded part of the virtual world, and list these tile references as the working set.

A SO may be a texture and a predictor may request from the application all virtual objects within a determined virtual distance of the application's current, past and/or future virtual camera position. The predictor may inspect each object, determine the tiles the object can use, and add those tiles to an internal list. The predictor outputs this list as the working set.

The predictor may predict the working set by looking up a number of virtual objects and/or SOs, and (a subset of) their tiles in a data structure. The data structure may be a quad tree, a BSP tree, k-d tree, other tree data structures, or other data structures including but not limited to such as lists, linked lists, hash tables, dictionaries. It may store the entries in a spatial manner or allow spatial querying to find the virtual objects, SOs or tiles. The data structure can be constructed by the application at runtime. The data structure can be generated in advance and loaded from memory, including storage memory, by the predictor.

The predictor may predict the working set or determine a number of tiles that need to be streamed by looking up a precompiled list of tiles, or virtual objects with their tiles, or SOs with their tiles. The predictor may be triggered into loading the tiles of the list by the application at certain moments in time. The predictor may be triggered to load the tiles of the list when the virtual camera is in the range of a virtual object representing the list. The application may communicate the list to the predictor. The list can be constructed by the application at runtime. The list can be generated in advance and loaded from memory, including storage memory, by the predictor. For example, when an operator of the rendering camera in the virtual scene enters a room, a list of all tiles in that room may be incorporated into the description of the room in memory, the predictor may load the list and use its contents as its prediction results.

The predictor may predict the working set by looking up all virtual objects by shooting rays from a virtual camera position and finding the intersections of these rays with virtual objects. Once the virtual objects intersecting the rays are found, i.e., all objects visible in the scene, the objects' tiles are determined and added to an internal list. After processing all objects, this list is then communicated as the working set.

Figure 5:
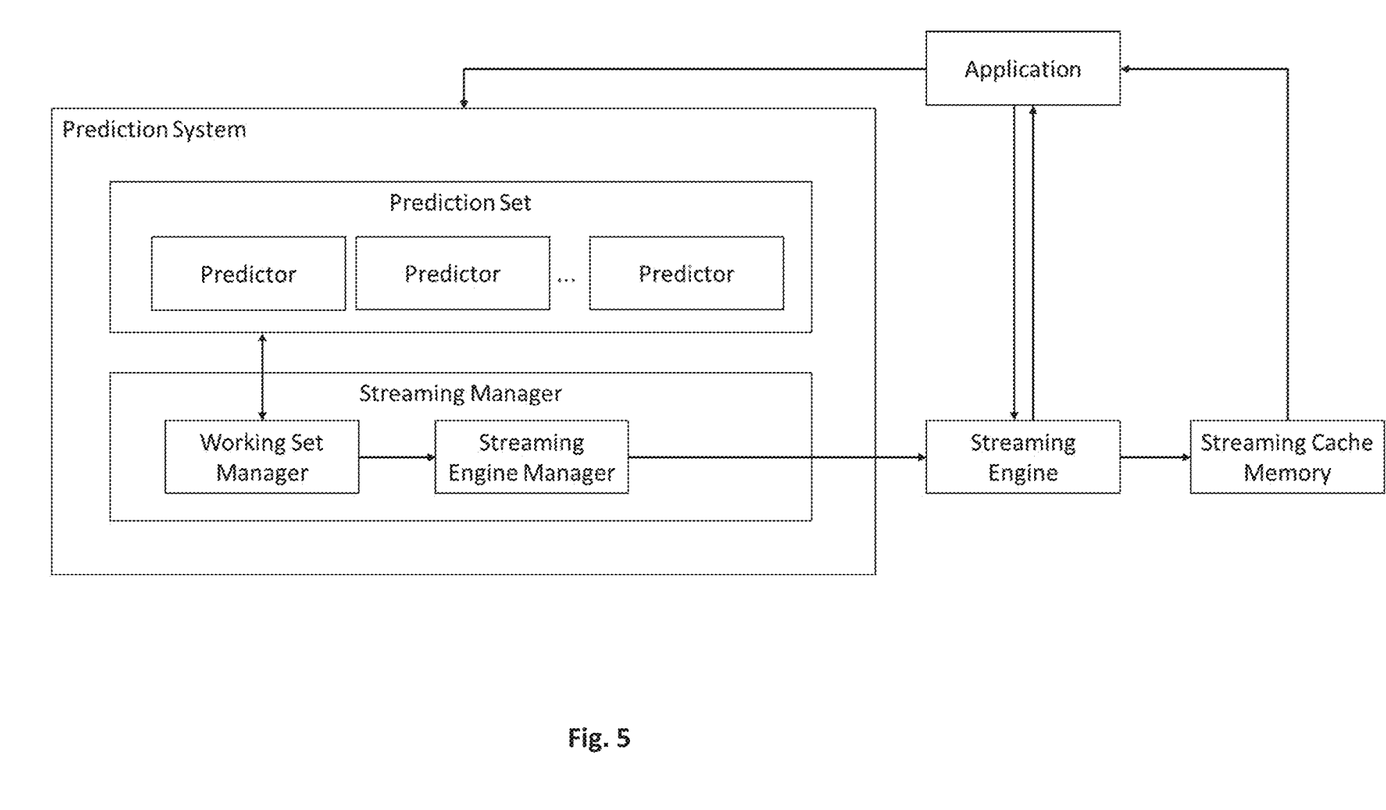
FIG. 5 illustrates an embodiment of the proposed prediction system.

FIG. 5 shows an embodiment of the proposed prediction system. In the presented embodiment the prediction system comprises of a set of predictors, a working set manager and a streaming engine manager. As explained previously, the prediction system, together with the application, steers the streaming system into loading SO tiles into the streaming cache memory. It does this by information it collects by running the predictors in the predictor set. These predictors may request or share knowledge or information of the virtual scene rendered or processed by the application. Using this information, the predictors predict the working set of tiles of the application for the current or future virtual scene. The predictors may run independently from the application. The predictors may also use information of the application on which tiles the application requests of the streaming engine.

Figure 6:
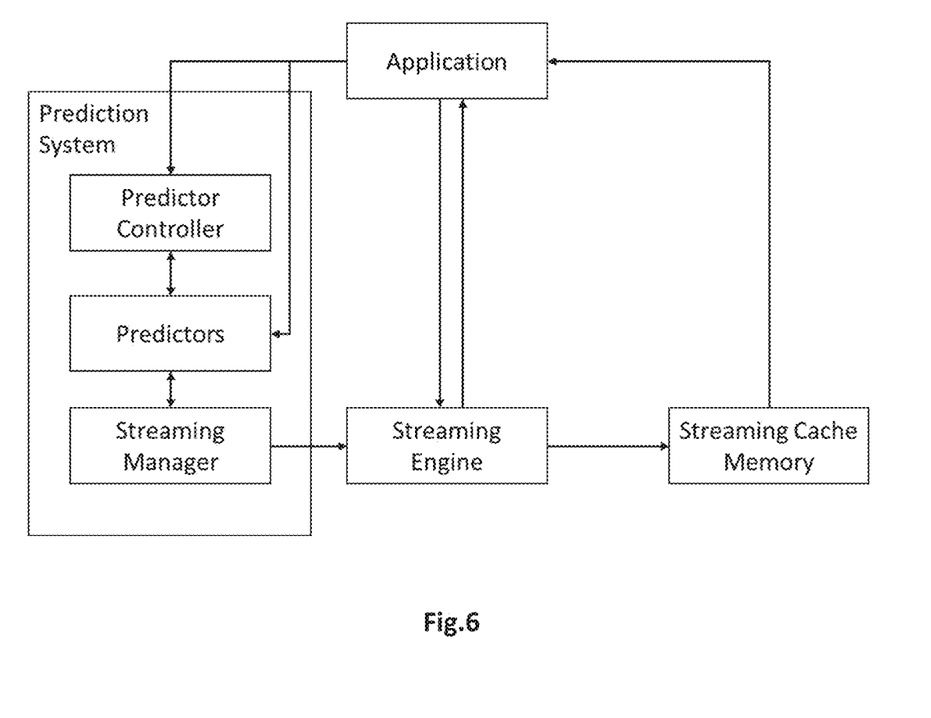
FIG. 6 illustrates another embodiment of a data caching system according to the invention.

In a preferred embodiment the system comprises a predictor controller to control the prediction system, e.g. to trigger a predictor to run. FIG. 6 illustrates this. A system with a predictor controller is clearly equivalent to a system without such a controller, but where instead the prediction system itself holds the controlling logic, e.g. logic as described with respect to the prediction system of FIG. 5. In one embodiment this logic may even reside in the application, the streaming engine or any other component available in the system.

The predictor controller may request information from the application or use information shared by the application, such as, but not limited to, information on the virtual rendering scene, rendering behaviour, etc., in order to perform its controlling function. It may also use information on the computer system resources. For example, the controller may retrieve from the system the number of CPU cores and GPUs and determine the amount of predictors in its subset based on these numbers. For example, it may initiate a run of each predictor on a different CPU core or GPU and therefore make optimal use of the available resources.

At certain time intervals the prediction system runs a set of prediction algorithms. The prediction algorithms may run asynchronously of the application without specific requests from the application to the streaming system. The prediction algorithms may run synchronously, where the predictors may run each time the application requests a certain tile to the streaming system. The application may trigger a predictor to run. If present, a predictor controller may run or initiate a run at certain intervals of the set of prediction algorithms.

Each of the predictor algorithms calculates a proposal of the scene's working set of tiles and passes its results to the working set manager. The working set manager manages the different proposals of the scene working set and combines them to form a single scene working set. This working set is communicated by the working set manager to the streaming engine manager. The streaming engine manager may detect changes to the working set and manages the streaming engine accordingly. The streaming engine manager initiates steering instructions for the streaming engine, for example, by outputting loading requests for new tiles or by signalling the streaming engine to free cache slots for tiles not present anymore in the working set. Note that the functionality of the working set manager and the streaming engine manager can be combined without departing from the scope of the invention. Also note that the predictors can be integrated into the application without departing from the scope of the invention. The streaming engine manager can be part of a streaming engine that accepts descriptions of the working set it needs to manage. This can be considered as a system sending a working set loading operation.

The predictor set comprises a number of predictors. The predictor set may contain predictors for different sorts of SOs, for example, one predictor for textures and one for point clouds. Each predictor may run or initiate its calculations continuously at a certain frequency according to a timing scheme. The predictors may run synchronously or asynchronously to the application. The application may trigger a predictor to run. The timing scheme may describe the frequency at which the predictor is run in Hertz. For example, a high accurate predictor is set to run at a frequency of 20 Hz, i.e., every 50 milliseconds. For an application rendering a virtual world at 60 Hz, this corresponds to running the predictor every three rendering frames. Alternatively, the timing scheme indicates at which moments a predictor is run by specifying the number of rendering frames between each initiation. For example, the timing scheme specifies a number of three frames between each initiation. If the application renders the scene at 30 Hz, this means the predictor will run at 10 Hz. The predictor frequency may be synchronized to the rendering frequency. For example, a predictor may run its calculations in the same thread that is responsible for issuing the rendering commands to the rendering API. This thread may initiate a run each time the thread starts rendering a frame. Instead of the prediction system or the application, a predictor controller may define or impose the timing scheme.

Figure 7:
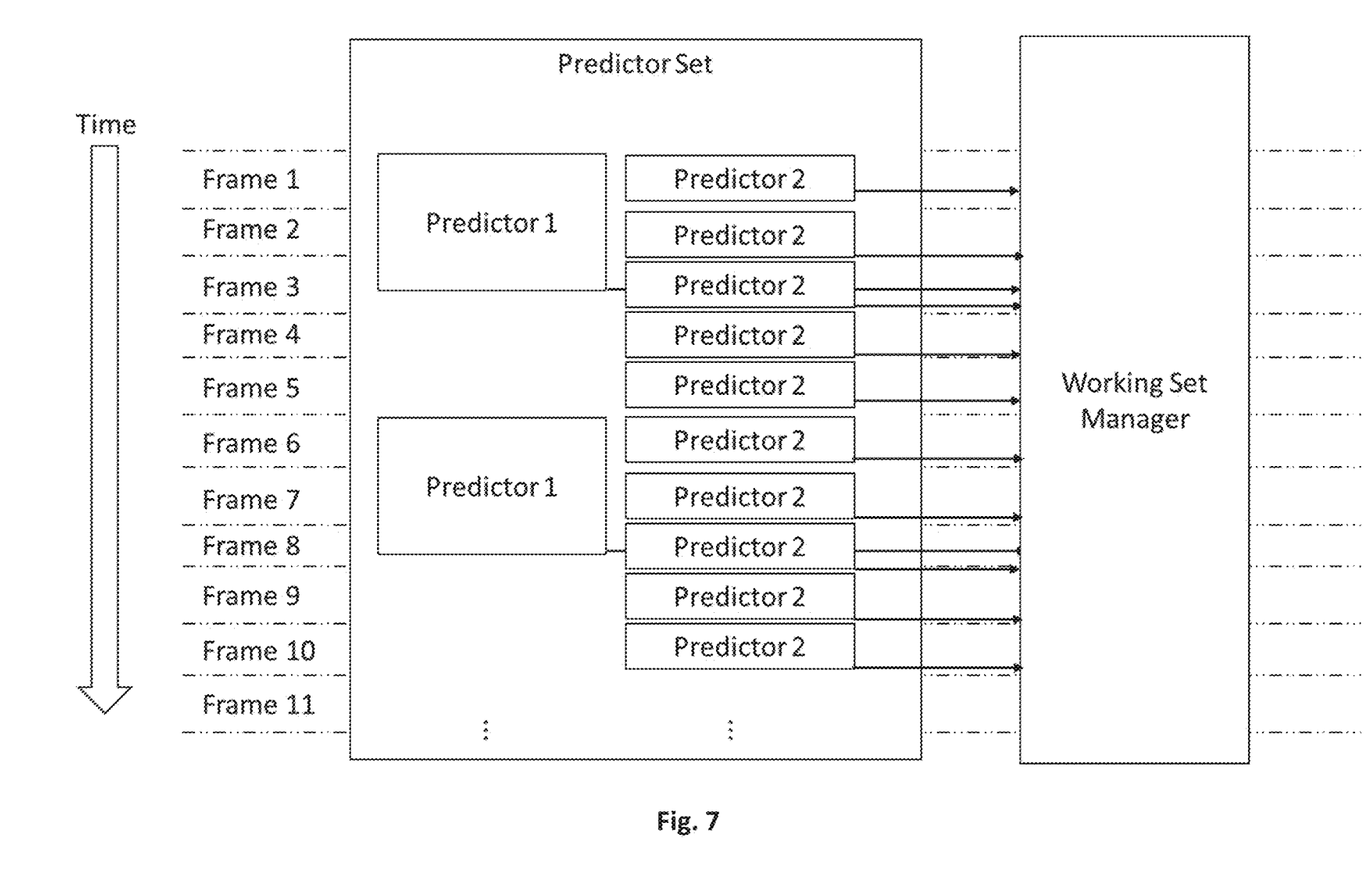
FIG. 7 illustrates a timing scheme of a prediction system with two predictors.

FIG. 7 illustrates an example. Where a SO is a texture, the predictor set may contain two predictors. One of the predictors is a highly accurate, highly complex predictor which renders the scene as described above. The other predictor is a lower accurate, low complex predictor which lists all tiles within a certain virtual distance of the virtual camera. The first predictor is run every five rendering frames, while the second predictor runs every rendering frame. The figure shows how the first predictor takes up a significant amount of time until the results are presented to the streaming engine manager, namely, after 2 frames. The second predictor, however, presents its results within the same rendering frame to the streaming engine manager. Note that in the example the first predictor algorithm is not run for frames 4 and 5. The results may take additional time until they become available in the system memory. For example, rendering an image on the GPU and reading back the resulting image takes a similar delay of 2 to 3 frames. As illustrated by this example, at specific times there may be only a single predictor active (e.g., frames 4-5). However, over the course of the application's running time, multiple predictors, two in this example, are used.

In one embodiment, if a predictor is set to be initiated while a previous instance of that predictor is still running, the predictor is not scheduled to run. For example, if a predictor takes 10 ms to run and it is scheduled to run at 120 Hz, then the predictor will run at an actual frequency of 100 Hz. In another embodiment, if a predictor is set to be initiated while a previous instance of that predictor is done running, but its results are still being copied to memory, the new instance may be initiated. For example, the results of a predictor process running on the GPU can be copied asynchronously to system memory, while a new instance of that same predictor is initiated. In another embodiment, if a predictor is set to be initiated while a previous instance of the same predictor is still running, the predictor may still be initiated for a new run.

In one embodiment the initiation of the predictor may be triggered by the application or another operator. The predictor may run continuously or may run a certain number of times. In an embodiment of the system with a predictor controller, it may be the predictor controller that triggers the initiation of the predictor. The predictor controller may receive a signal from the application to initiate a predictor.

In one embodiment all predictors or a subset of predictors can run at the same frequency. They may present their results at different times, as some predictors may need a longer time to calculate than others. The predictor controller, if present, or else the prediction system itself may impose this frequency or rate on the predictors.

It may be that only a subset of all available predictors is run. This subset can be determined at run time. For example, the number of active predictors is chosen in accordance with the number of CPU cores in a system. The subset can be predetermined by the system operator, for example, by means of a user-set constant in the application. As predictors may run at different frequencies, it is possible that at a certain time in the application's lifetime/runtime only one predictor or no predictors at all is running, but that over the application's lifetime, multiple predictors are active. If the prediction system comprises a predictor controller, the latter may hold the logic to determine, possibly at run time, which subset of predictors to run at which time interval. During the application's lifetime, the predictor controller or the prediction system may continuously determine this subset and at which time it runs, and may continuously change the subset and the timing scheme. For example, the prediction system continuously queries the operating system for the computational load on each CPU core and changes the active subset of predictors accordingly. For example, when the prediction system finds out the system is under heavy load, it changes the subset of active predictors to a subset that exhibits a lower computational complexity or in another example, it changes the subset to a subset that uses more GPU resources and, hence, alleviates the CPU cores.

The predictor controller, if present, or else the prediction system itself may have knowledge of the accuracy of the outcome of each predictor and/or the computational complexity of the predictor, and adjust the subset of predictors to run and/or the timing scheme accordingly. For example, the controller may adjust the run frequency of a predictor by lowering it, knowing that a predictor is highly accurate, but highly complex. The predictor controller or prediction system may measure the predictor accuracy and/or complexity, or may query the application, streaming manager, streaming system, computer system or any other system to retrieve this information, at run time or based on predetermined values. Based on this measurement, it can adjust the subset of predictors to run and/or adjust the timing scheme. It may do this continuously throughout the run time of the application.

A system running one or more predictors is clearly equivalent to a system running a single predictor performing the prediction algorithms of said one or more predictors and combining the output to a single set of predicted subregions. Such a system can be considered equivalent to combining the predictors, streaming manager and predictor controller into one logical unit.

Each predictor run by the system presents its results to the tile working set manager. The tile working set manager combines multiple working set proposals received from the set of predictors, into a single working set. This working set is communicated to the streaming engine manager, which steers the streaming engine accordingly. For example, the streaming engine manager may output steering instructions to load a working set, it may output steering instructions to unload specific subregions, to remove subregions from the streaming cache, etc.

A tile working set is a list of tile references (including those of different LOD) the cache system should have in memory for best rendering results. The tile references may comprise a tile index and LOD indication.

The working set manager may have knowledge of the accuracy of each predictor in the predictor set. Therefore, it can distinguish between inaccurate and accurate working set descriptions. The working set manager can hold for each predictor a range of valid LOD levels. The working set manager loops over all tile references in the proposed working set and discards tile references with a LOD outside of this range. The remaining tile references are added to the refined working set. In one embodiment, the working set manager does not have knowledge of the accuracy of each predictor, but each predictor only outputs results for the tiles it can predict with high accuracy.

For example, in case the SO is a texture and two predictors are active: a highly accurate predictor rendering the scene and a low-accuracy predictor which iterates all tiles within a given virtual range. The working set manager can hold a range of LOD level [0, 1] for the first predictor and a range of LOD levels of [2, 10] for the second predictor. For the first predictor's results, the working set manager discards all tile references with LOD level higher than 1. In other words, only the highest-detailed two MW levels remain in the working set. For the second predictor's results, the working set manager discards all tile references with LOD level smaller than 2. In other words, only the lowest-detailed MIP levels (all but the two highest-detailed MIPs) remain. The working set manager combines these two working sets by concatenating the two working sets. In other words, the first predictor is used to find the tiles visible in the screen with the highest detail. The second predictor is used to find the lower resolution tiles that will be visible in future frames when the first predictor is not running.

In one embodiment the working set manager assigns weights to each tile reference in the working set proposal presented by a predictor. These weights may be in relation to the predictor accuracy.

For example, in case the SO is a geometry model, the cache system holds two predictors, one performing the ray tracing algorithm as discussed earlier and the other iterating all SO tiles in a given distance from the current, past or future virtual camera position, also as discussed above. The working set receives the results from the first predictor and assigns a weight to each of the tile references in the working set. For example, the tile description resulting from the second predictor can have a smaller weight than that of the first predictor, thereby instructing the working set manager to prioritize the second predictor output. The working set manager can choose to drop tile references based on their weights. Another option is not to drop tiles, but passing the weights through to the streaming engine manager which can then perform its cache replacement strategy based on the weight. Also, a frame counter, increasing each time a new frame is rendered by the application, can be incorporated into the weight. The current time could be incorporated. These approaches may give additional weight to the newest results.

In one embodiment the working set manager may combine the predicted sets of the predictors into a single working set by optimizing or refining the output of one or more predictors by analysing the output of other predictors. For example, a predictor may output a set of subregions corresponding to every visible subregion using a virtual camera rendering with a wider field of view (FOV) than normal. Another predictor outputs a set of subregions corresponding to a narrower FOV. The working set manager may receive both sets, refine the set corresponding to the wide FOV by removing subregions occurring in the set with the narrow FOV, and output subregion loading instructions to the streaming engine for the resulting set of subregions.

In another embodiment the working set manager may receive a set of predicted subregions from a predictor, determine the working set as this set of subregions and let the streaming manager prioritize the corresponding steering instructions for the streaming engine by looking at the output of another predictor. In such a system multiple predictors are active, but the output of the predictors determines the priority or the order of the steering instructions the streaming manager outputs. For example, the output of all predictors can easily be aggregated and sent to the streaming manager, but the order in which the streaming manager outputs the steering instructions can be determined by the output of the individual predictors. For example, with two predictors as discussed in the example in the previous paragraph, the working set manager receives the output of a predictor with a wide FOV and the streaming manager outputs steering instructions for each subregion in the output set of predicted subregions of said predictor. However, the order in which the steering instructions are outputted is given by the working set manager by analysing the output of the second predictor with a narrow FOV. Specifically, subregions present in the set corresponding to the wide FOV but not the one corresponding to the narrow FOV are given a higher priority.

In one embodiment the working set manager may combine working sets it receives from the predictors implicitly by relying on the underlying or available systems or application. For example, the working set manager may aggregate the working sets it receives and send them to the streaming manager. The streaming manager steers the streaming engine to stream every subregion in the working set and relies on the underlying operating system to eliminate duplicate requests to load a file from memory.

After the working set manager has combined the proposed working sets of the predictors into a single working set, the resulting working set is presented to the streaming engine manager. The streaming engine manager steers, based on the working set it receives, the streaming engine in streaming the required tiles not available in the cache. When it receives a working set, it loops over all tile references. Tiles already resident in the cache memory remain resident and new tiles are signalled to be streamed to the cache. The streaming engine manager may approach the cache using a number of strategies. For example, it may use a least-recently-used (LRU) strategy, where tiles that were the least-recently used, are replaced in the working set. Various working set combination strategies are applicable.

In one embodiment the streaming engine manager may just present the streaming engine steering instructions to load the resulting working set and rely on the streaming engine to stream the working set. In another embodiment the streaming engine manager may rely on functionality of the streaming engine to help manage or hint the use of, amongst others, the streaming cache and streaming priority. In another embodiment the streaming engine manager may compare the working set of subregions it received from the working set manager or the predicted sets of subregions from the predictors with information on subregions kept in memory, for determining steering instructions to steer the streaming engine. In such a way, for example, the streaming engine manager can steer the streaming engine manager into streaming more precisely.

The streaming engine manager can flag cache slots which are not used in a period of time as available for holding newly streamed tiles. In another embodiment the streaming engine manager receives the weights of the tiles from the working set manager, and replaces tiles according to their weights. For example, tiles slots holding tiles with a smaller weight make room for tiles with a larger weight. In another embodiment a frame counter, increasing each time a new frame is rendered by the application is incorporated into the weight. Also the current time can be incorporated. These two approaches may give additional weight to the newest results and instruct the streaming engine manager to prioritize the newest results. Several cache replacement strategies are applicable, not limited to the examples given here.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:
1. A system comprising:
one or more computer processors;
one or more computer memories; and
a set of instructions incorporated into the one or more computer memories, the set of instructions configuring the one or more computer processors to perform operations for facilitating rendering of a virtual world of a computer graphics application, the operations comprising:
receiving data describing the virtual world from the computer graphics application;
analyzing the received data using a plurality of predictors, the analyzing including applying a different prediction scheme according to each predictor of the plurality of predictors to identify a predicted set of subregions belonging to streamable objects to be used for rendering the virtual world;
combining the predicted sets of subregions into a working set of subregions to be used for the rendering, the combining based on an analysis of output from each predictor;

determining priorities of steering instructions for loading subregions of the working set into a streaming cache memory to be used for the rendering, the determining of the priorities based on an analysis of output from each predictor; and outputting the steering instructions to a streaming engine to perform the loading of the subregions in order of the priorities.

2. The system as in claim 1, wherein at least one streamable object is represented by subregions corresponding to a plurality of different level-of-detail versions of the at least one streamable object.

3. The system as in claim 1, the operations further including applying a timing scheme for the application of a prediction scheme by one or more predictors of the plurality of predictors.

4. The system as in claim 3, wherein the timing scheme is determined at a run time of the application.

5. The system as in claim 3, wherein the timing scheme is determined in accordance with available system resources.

6. The system as in claim 3, wherein the timing scheme is determined based on a computational complexity of a prediction scheme applied by the one or more predictors.

7. The system as in claim 3, wherein the timing scheme is determined based on an accuracy of results of the predicted sets of subregions and/or a delay at which the predicted sets become available.

8. The system as in claim 1, wherein each prediction scheme has a different measure of accuracy of the output.

9. The system as in claim 1, wherein one of the predicted sets is generated by determining which streamable objects or which subregions are within a predetermined virtual distance from a position in the virtual world.

10. The system as in claim 1, wherein at least one of the prediction schemes comprises rendering a scene from a virtual camera position in the virtual world and identifying a set of unique subregion identifiers associated with streamable objects visible by a virtual camera at the virtual camera position, and outputting the set of unique subregion identifiers.

11. The system as in claim 1, wherein at least one of the prediction schemes is configured for performing a first prediction associated with a main virtual camera position in the virtual world, and a second prediction associated with a second virtual camera position, the second virtual camera position being associated with a future main virtual camera position.

12. The system as in claim 1, wherein at least one of the prediction schemes is configured for performing a prediction whereby streamable objects in the virtual world are rendered from a point of view with no occluding objects or wherein occluding objects are rendered with a level of transparency.

13. The system as in claim 1, the operations further including assigning a weight to the various subregions of the predicted sets, the weight determining a priority for inclusion in the working set and a priority within the steering instructions.

14. The system as in claim 13, wherein the weight takes into account a number of occurrences of a subregion in the plurality of predicted sets.

15. The system as in claim 1, the operations further including selecting memory slots to be reused and forwarding an indication of the selected memory slots in the instructions.

16. The system as in claim 1, the operations further including:

modifying an output of one or more predictors using the output of at least one other predictor; and performing at least one of adjusting the combining of the predicted sets of subregions based on an analysis of the modified output and adjusting the determining of priorities based on an analysis of the modified output.

17. The system of claim 1, wherein the combining of the predicted sets of subregions into the working set of subregions to be used for the rendering is based on an analysis of a measure of output accuracy from each predictor.

18. The system of claim 1, wherein the determining of the priorities of steering instructions is based on an analysis of a measure of output accuracy from each predictor.

19. A non-transitory computer-readable storage medium storing a set of instructions that, when executed by one or more processors, causes the one or more processors to perform operations for facilitating rendering of a virtual world of a computer graphics application, the operations comprising:

receiving data describing the virtual world from the computer graphics application;

analyzing the received data using a plurality of predictors, the analyzing including applying a different prediction scheme according to each predictor of the plurality of predictors to identify a predicted set of subregions belonging to streamable objects to be used for rendering the virtual world;

combining the predicted sets of subregions into a working set of subregions to be used for the rendering, the combining based on an analysis of output from each predictor;

determining priorities of steering instructions for loading subregions of the working set into a streaming cache memory to be used for the rendering, the determining of the priorities based on an analysis of output from each predictor; and outputting the steering instructions to a streaming engine to perform the loading of the subregions in order of the priorities.

20. A method comprising:

performing, using one or more computer processors, operations for facilitating rendering of a virtual world of a computer graphics application, the operations comprising:

receiving data describing the virtual world from the computer graphics application;

analyzing the received data using a plurality of predictors, the analyzing including applying a different prediction scheme according to each predictor of the plurality of predictors to identify a predicted set of subregions belonging to streamable objects to be used for rendering the virtual world;

combining the predicted sets of subregions into a working set of subregions to be used for the rendering, the combining based on an analysis of output from each predictor;

determining priorities of steering instructions for loading subregions of the working set into a streaming cache memory to be used for the rendering, the determining of the priorities based on an analysis of output from each predictor; and outputting the steering instructions to a streaming engine to perform the loading of the subregions in order of the priorities.

* * * * *